United States Patent
Cassar

(10) Patent No.: US 7,187,261 B2
(45) Date of Patent: Mar. 6, 2007

(54) MAGNETIC STRIP

(76) Inventor: Victor E. Cassar, 9 Monterra Ave., Hawks Nest New South Wales 2324 (AU)

( * ) Notice: Subject to any disclaimer, the term of this patent is extended or adjusted under 35 U.S.C. 154(b) by 0 days.

(21) Appl. No.: 10/511,532

(22) PCT Filed: Oct. 11, 2002

(86) PCT No.: PCT/AU02/01384

§ 371 (c)(1),
(2), (4) Date: Aug. 29, 2005

(87) PCT Pub. No.: WO03/090236

PCT Pub. Date: Oct. 30, 2003

(65) Prior Publication Data

US 2006/0006969 A1    Jan. 12, 2006

(30) Foreign Application Priority Data

Apr. 17, 2002   (AU) .................................. PS1795

(51) Int. Cl.
*H01F 7/02* (2006.01)

(52) U.S. Cl. ........................ 335/306; 335/303

(58) Field of Classification Search ........ 335/302–306; 224/183; 24/303

See application file for complete search history.

(56) References Cited

U.S. PATENT DOCUMENTS

| | | | | |
|---|---|---|---|---|
| 3,483,494 | A | * | 12/1969 | Cromie ...................... 128/852 |
| 3,546,643 | A | | 12/1970 | Virostek |
| 3,636,568 | A | * | 1/1972 | Stuner ....................... 2/161.6 |
| 3,665,355 | A | | 5/1972 | Sasaki et al. |
| 3,727,658 | A | | 4/1973 | Eldridge, Jr. |
| 3,924,212 | A | | 12/1975 | Brown |
| 4,826,059 | A | * | 5/1989 | Bosch et al. ................ 224/183 |
| 5,593,073 | A | * | 1/1997 | Finnegan .................... 224/183 |
| 5,604,960 | A | * | 2/1997 | Good .......................... 24/303 |
| 6,530,508 | B1 | * | 3/2003 | Devine ....................... 224/183 |

* cited by examiner

*Primary Examiner*—Elvin Enad
*Assistant Examiner*—Bernard Rojas
(74) *Attorney, Agent, or Firm*—Bell, Boyd & Lloyd, LLP

(57) ABSTRACT

A magnetic strip that comprises a series of magnets, a flexible material strip locating and at least in part enclosing each surface of each magnet to define a longitudinal flexible arrangement capable of coupling to itself, a magnetisable material or to another magnet.

18 Claims, 3 Drawing Sheets

MAGNETIC STRIP

FIELD OF INVENTION

The present invention relates to a magnetic tape. The present invention also relates to an arrangement for packaging magnets.

BACKGROUND OF THE INVENTION

A magnet is often used to hold an article. A typical magnet is composed of a hard, metallic material and, in use, attractive magnetic forces between the magnet and a magnetisable material are exploited to hold the article. Magnets find application in heavy industry, but are also used for domestic purposes. An example for the latter is the well-known fridge-magnet. Such a magnet is arranged to hold an article on a metallic door of a refrigerator. In this or similar applications the article is clamped between a metallic surface and a face of the magnet or alternatively the article is attached to the magnet which may be in direct contact with the metallic surface. Care must be taken so that the magnet does not scratch or otherwise damages the article or the metallic surface.

SUMMARY OF THE INVENTION

In a first aspect the present invention provides a magnetic tape comprising:
- a pair of flexible strips being connected in a face to face relationship with one another and intermediate said connections defining a plurality of pockets; and
- a plurality of magnets each being housed within respective of the pockets to permit movement of the magnets therein.

The two layers most preferably are substantially identical and preferably are welded together.

The magnets preferably have a substantially cylindrical shape which has a cross-section that is substantially round and are more preferably disc-shaped.

The flexible material may entirely enclose each magnet and preferably comprises a polymeric material.

The magnets preferably are located remote from each other and more preferably are spaced longitudinally along the tape in one or more rows.

Each of the magnets within the magnetic tape preferably is oriented such that the polarity of the magnets is substantially uniform relative to the flexible strips. The magnets preferably comprise a rare earth material.

The magnetic tape may be provided in form of a continuous rope-like tape.

The magnetic tape may comprise a label which may be used for advertising purposes and may also comprise at least one means for carrying an article such as a hook.

The above-defined magnetic tape has a range of applications. The magnet tape may, for example, be used to locate the article on a magnetisable material such as a door of a refrigerator. The flexible strip reduces likelihood of damaging or scratching of the article or of the magnetisable material by the magnet.

The magnetic tape preferably comprises a series of magnets of high strength. The magnetisable material to which, in use, at least one of the magnets attaches may be the article itself or another one of the magnets of the magnetic tape. For example, the magnetic tape may be used to enclose the article by forming a closed loop with individual magnets of the strip clipping to each other. Usually the magnet tape does not need to be adjusted to hold the article. The article may be one of many articles and the tape may be arranged to hold together all of the articles. The tape may hold together shower curtains and may also be used to secure fly-screen on cars or tents. Further, the tape may be used to hold together garments, to hold name-tags, and may find application as a cloth peg or may even be used to hold doors open.

In general the magnetic tape may be used for a novel way of packaging, distributing, selling and using magnets.

The magnetic tape may be sold like lengths of a chain or a rope cut to a required length. The flexible strip material may be selected to suit specific requirements such as cost efficiency for packaging and durability for long term applications. The magnetic tape may be rolled or pulled out to the required length and cut to that length. The user may then cut it to various smaller lengths, individual sections containing only one magnet or even remove the flexible strip material exposing the individual magnets. Once the user has cut the magnetic tape to the useable required length, the magnetic tape may be applied to a ferrous metal surface (such as the wall of a steel garden shed) and the magnetic tape will adhere to that surface. The magnetic tape may then be used to adhere to other ferrous objects such that a rack of the objects is formed. Should the user wish to apply the magnetic tape to a non-magnetic surface the magnetic tape may be glued, stapled, tied or otherwise adhered to the non-magnetic surface. A person skilled in the art will appreciate that many more applications are possible.

According to a second aspect of the present invention there is provided a packaging arrangement for magnets, said arrangement comprising:
- a pair of flexible strips being connected in a face to face relationship with one another and intermediate said connections defining a plurality of pockets; and
- a plurality of magnets each being housed within respective of the pockets to permit movement of the magnets therein.

Each of the pockets preferably is formed from a polymeric material.

In one embodiment the pockets may be closed and may be coated or charged with a substance that reduces rusting of the magnets. Magnets such as NdFeB magnets rust relatively quickly and the substance therefore may reduce deterioration of the magnets. The substance may be provided in the form of a coating on the inside of the pockets or, alternatively, the substance may also be provided in the form of a fluid such as a liquid or a gas.

According to a third aspect of the invention there is provided a method of fabricating a magnetic tape, said method comprising the steps of:
- locating a plurality of magnets in spaced apart relationship between a pair of flexible strips;
- connecting the pair of flexible strips in a face to face relationship with one another wherein a plurality of pockets are formed intermediate said connections, each of the magnets being housed within respective of the pockets which permit movement of the magnets therein.

The connection of the two strips may take place in a sequence of discrete steps after an individual one of the magnets is positioned. Alternatively, the two strips are joined when more than one magnet is positioned between the layers.

The step of joining the two strips preferably is conducted such that the magnets are enclosed. Joining the two strips may be effected by gluing, sewing or stapling but, especially if the flexible strip material is polymeric, comprises welding such as high frequency welding. The two layers of the flexible strip material preferably are provided separately from each other and most preferably are provided in form of two strips which may be substantially identical. The method preferably is a continuous process for the production of a continuous length of the magnetic tape.

Preferred embodiments of the invention will now be described, by way of example only, with reference to the accompanying drawings.

DETAILED DESCRIPTION OF THE INVENTION

Figure 1:
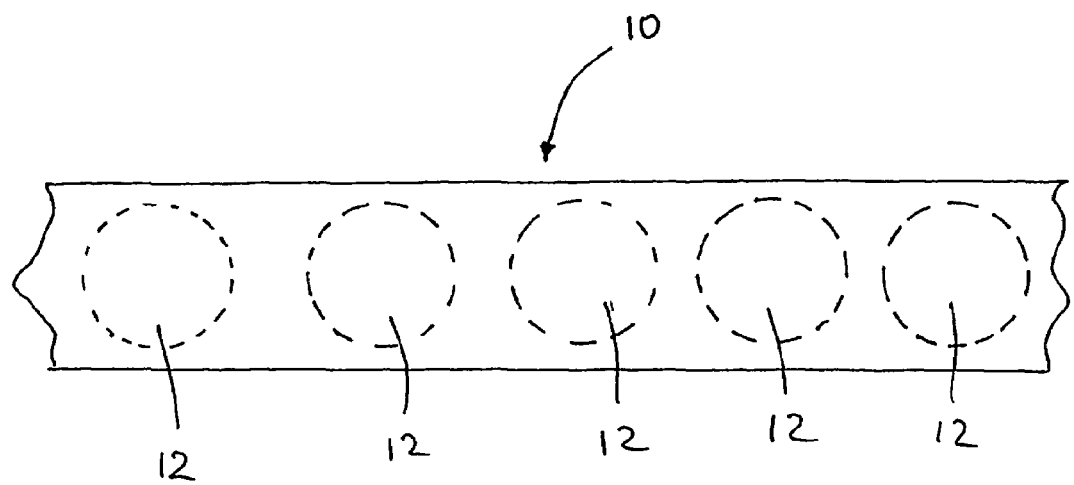
FIG. 1 shows a schematic representation including a top plan view of a magnetic tape according to an embodiment of the present invention.
Figure 2:
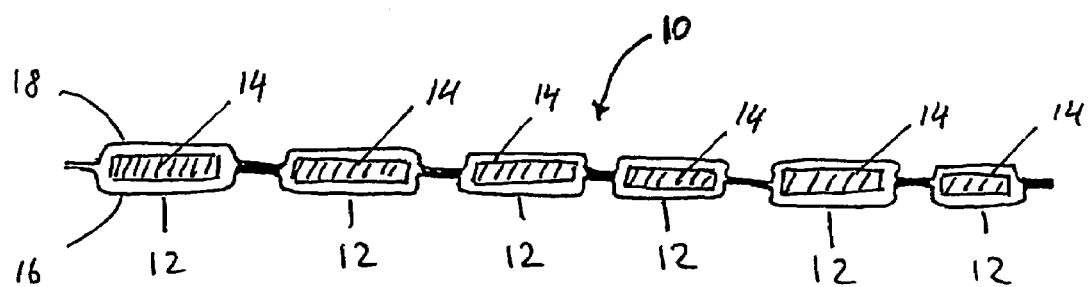
FIG. 2 shows a cross-sectional representation of the magnetic tape of FIG. 1.

Referring to FIGS. 1 and 2, a magnetic strip, according to an embodiment of the present invention, is now described. The Figures show a magnetic assembly, unit or strip 10 comprising a flexible material including a plurality of flexible strips 11a and 11b. The interior surfaces 32 of the strips 11a and 11b define a plurality of pockets 12 housing a plurality of magnetic members or magnets 14. In this example, the flexible strips 11a and 11b are waterproof and the magnetic strip 10 has a first side 16 with a substantially uniform positive polarity (represented by the "+" sign after 16) and a second side 18 with a substantially uniform negative polarity (represented by the "−" sign after 18). The magnetic strip 10 can be detachably connected to an article, such as object or article 24, and the strip 10 can be wrapped around an article 24 in a closed-loop configuration.

The flexible strip material 12 may be provided in form a thin polymer of acetate, styrene or PVC as used in packaging materials. Alternatively, the flexible strip material 12 may comprise a fibre reinforced PVC sheet or urethane. This is particularly advantageous for applications requiring durability and weatherproofing. As the thickness of the flexible strip material 12 influences the useful strength of the invention a compromise between durability and required magnetic strength needs to be found.

In another embodiment of the invention the magnetic tape 10 forms an arrangement for packaging magnets 14 and comprises a plurality of pockets that are joined together and are used to accommodate the magnets 14. In this case the magnetic tape 12 is also composed of a waterproof polymeric material. The magnetic tape may incorporate high strength magnets such as those made of the rare earth alloy NdFeB (Neodymium Iron Boron). The use of these magnets improve the coupling strength of the magnetic strip. On the other hand high strength magnets are difficult to handle and to separate in large quantities and this embodiment of the invention therefore also relates to packaging advantages. By packing the magnets 14 according to the above-described method, the NdFeB magnets become easy to handle and to separate as the flexible strip material provides a means of leverage between the magnets. It also prevents the magnets from chipping and from corrosion providing extended life for the magnets.

A method of producing the magnetic tape according to another embodiment of the invention is now described. Initially two continuous rolls of 50 mm wide stripes of fibre reinforced PVC sheeting are provided. The strips are brought together with a magnet positioned between them. The two strips covering the magnet are then welded together around one of the magnets using high frequency welding whereby the magnet is encapsulated in hermetically sealed capsules. The next magnet is then inserted between the two strips at a distance of approximately 50 mm behind the previous (first) magnet and the process of welding the strips together around the second individual magnet is repeated. This process is continuously repeated until one of the strips of the fibre reinforced PVC sheeting runs out If one of the strips runs out, it is joined to a new roll of the same material and the process recommences.

Although the invention has been described with reference to particular examples, it will be appreciated by those skilled in the art that the invention may be embodied in many other forms.

Figure 3:
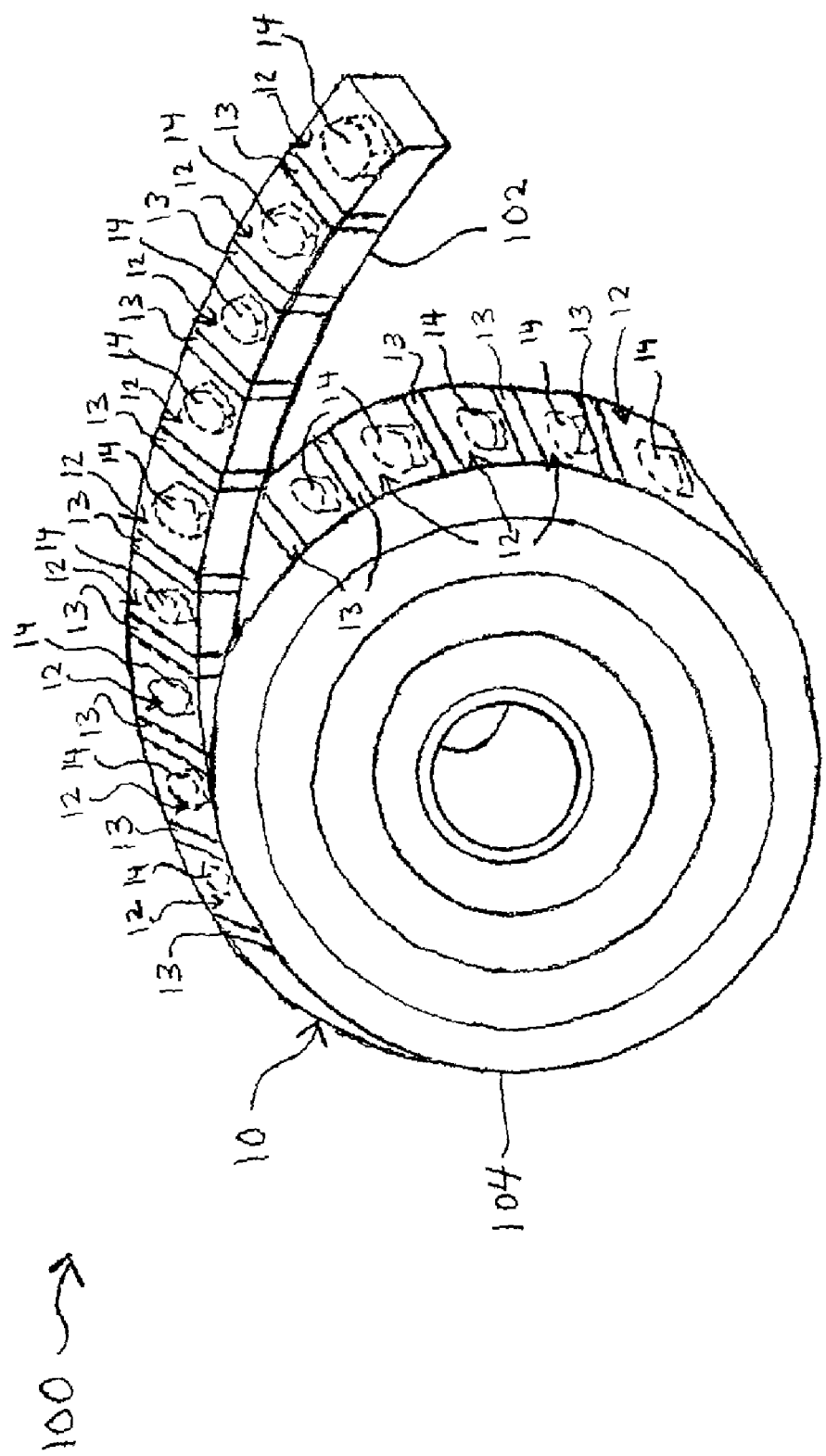
FIG. 3 is a side perspective view of the roll of the flexible unit, assembly or strip of one embodiment.
Figure 4:
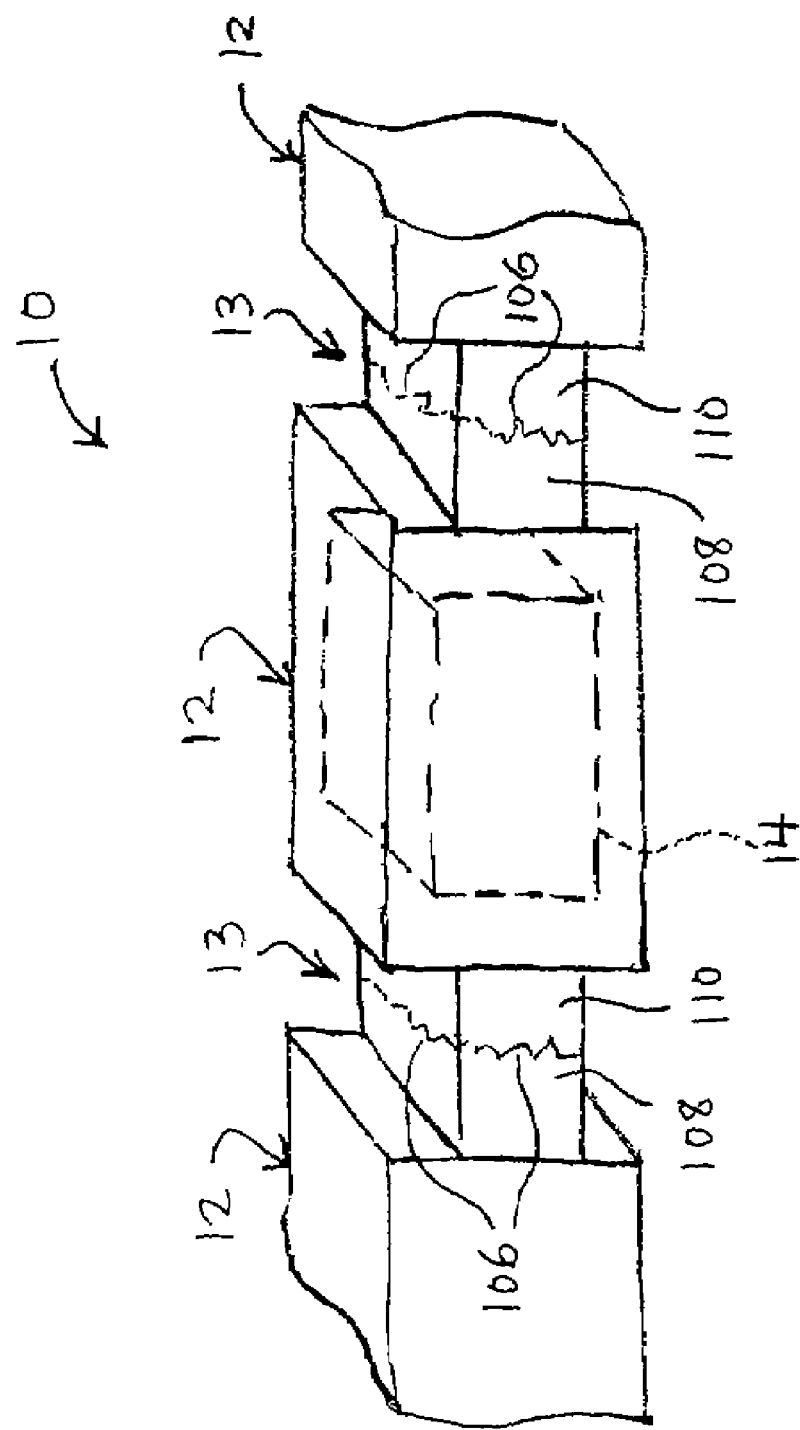
FIG. 4 is an enlarged fragmentary view of a portion of the unit, assembly or strip of one embodiment, illustrating the separation line and parts of the connection regions.

Referring to FIGS. 3–4, the magnetic unit, assembly or strip 10 may, in one embodiment, be sold like lengths of a chain or rope cut to a required length. The flexible material may be selected to suit specific requirements such as cost efficiency for packaging and durability for long term applications. The magnetic unit, assembly or strip 10 may be rolled into a roll 100. A separable part or retrievable part 102 of the roll 100 can be pulled out to the required length and cut to that length. In this case, the reservable part 104 remains on the roll 100 until additional strip 10 is needed. The cutting of the strip 10 can occur along any of the separation lines 106. Each separation line 106 is positioned between the regions or areas 108 and 110 of each one of the connection regions 13.

The claims defining the invention are:

1. A magnetic tape comprising:
 a pair of flexible strips being connected in a face to face relationship with one another at a plurality of spaced-apart connection areas, the connection of the flexible strips forming a unit, the unit defining a pocket positioned between each one of the connection areas, a first part of the unit being separable from a second part of the unit, each one of the connection areas:
 (a) having a plurality of regions; and
 (b) being separable along a separation line between the regions, the separation of the regions operable to separate the first part from the second part, the unit having a plurality of magnets, at least one of the magnets being housed within each one of the pockets, the magnets being spaced longitudinally along the unit in one or more rows, each of the magnets having a first side associated with a first polarity and a second side associated with a second polarity, the magnets being oriented such that: (i) the first sides of the magnets are adjacent to one of the flexible strips; and (ii) the second sides of the magnets are adjacent to the other flexible strip, the magnets being operable to provide the unit with a plurality of magnetic regions enabling the first part of the unit to be:
 (x) magnetically attached to itself after the first part is separated from the second part; or
 (y) magnetically attached to an object after the first part is separated from the second part.

2. The magnetic tape of claim 1, wherein the pair of flexible strips are directly bonded to one another.

3. The magnetic tape of claim 2, wherein the unit has a flexibility enabling the unit to have a roll form.

4. The magnetic tape of claim 1, wherein the flexible strips are constructed of a polymeric and substantially impervious material.

5. The magnetic tape of claim 1, wherein: (a) the unit has a length; (b) the magnets are uniformly positioned along the length of the unit; (c) the unit is cuttable along the separation line; and (d) the separation line is straight or has at least one curve.

6. The magnetic tape of claim 1, which includes a roll formed through arrangement of the unit in a roll form in which the assembly has overlapping portions.

7. The magnetic tape of claim 1, wherein the first part of the unit has a configuration and flexibility enabling the first part to be: (a) magnetically attached to itself in a closed loop form after the first part is separated from the second part if the first part is attached to itself; and (b) magnetically attached to an object after the first part is separated from the second part if the first part is attached to the object instead of being attached to itself.

8. The magnet tape of claim 1, comprising at least one means for carrying an article, the means being connectable to the first part after the first part is separated from the second part.

9. A flexible securing device comprising:
a plurality of sides;
a plurality of connectors connecting the sides together at a plurality of flexible connection regions, the connected sides forming an assembly having a designated length, the assembly defining a plurality of pockets, each one of the pockets being positioned between a plurality of the flexible connection regions, the assembly being flexible between: (a) a first position in which the assembly has a non-loop configuration; and (b) a second position in which the assembly has a loop configuration, the assembly being separable into:
(a) a reservable part having a plurality of the flexible connection regions; and
(b) a retrievable part having a plurality of flexible connection regions, each one of the flexible connection regions of the assembly: (i) having a plurality of areas; and (ii) being separable along a separation line between the areas, the separation of a plurality of the areas operable to separate the reservable part of the assembly from the retrievable part of the assembly, the assembly having: a plurality of magnetic members, each one of the magnetic members having a positive polarity side and a negative polarity side, the magnetic members being positioned within the pockets so that:
(x) the positive polarity sides are adjacent to one of the sides of the assembly;
(y) the negative polarity sides are adjacent to another one of the sides of the assembly; and
(z) the retrievable part of the assembly is: (i) magnetically attachable to itself after the retrievable part is separated from the reservable part; or (ii) magnetically attachable to an object after the retrievable part is separated from the reservable part.

10. The flexible securing device of claim 9, wherein: (a) the magnetic members are uniformly positioned along the length of the assembly; (b) the assembly is cuttable along the separation line; and (c) the separation line is straight or has at least one curve.

11. The flexible securing device of claim 9, wherein the assembly has a flexibility enabling the assembly to have a roll form in which a plurality of portions of the assembly are overlapping.

12. The flexible securing device of claim 9, wherein the retrieved portion of the assembly has a configuration and flexibility enabling the retrievable part to be: (a) magnetically attached to itself in a closed loop form after the retrievable part is separated from the reservable part if the retrievable part is attached to itself; and (b) magnetically attached to an object after the retrievable part is separated from the reservable part if the retrievable part is attached to the object instead of being attached to itself.

13. The flexible securing device of claim 9, including means for carrying an article, the means being connectable to the retrievable part after the retrievable part is separated from the reservable part.

14. A roll of a flexible device, the roll comprising:
a first side;
a second side;
a plurality of connectors connecting the first side to the second side at a plurality of spaced-apart connection regions, the connection of the first side to the second side forming an assembly configurable in a roll form, the assembly having a designated length, the assembly defining a space positioned between each one of the connection regions, part of the length of the assembly being separable from another part of the assembly, the separable part defining one or more of the spaces; and
a plurality of magnetic members, at least one of the magnetic members being positioned within each one of the spaces of the assembly, the separable part having one or more of the magnetic members, the separable part being magnetically attachable to:
(a) itself after the separable part is separated from the assembly; or
(b) an object after the separable part is separated from the assembly.

15. The roll of claim 14, wherein the magnetic members are uniformly positioned along the length of the assembly.

16. The roll of claim 15, wherein (a) the assembly is cuttable along a line within each one of the connection regions; and (b) the line is straight or has at least one curve.

17. The roll of claim 14, including means for carrying an article, the means being connectable to the separable part after the separable part is separated from the assembly.

18. The roll of claim 14, including a rust reduction substance operable to reduce rusting of the magnets.

* * * * *